US011958540B2

(12) United States Patent
Pacella et al.

(10) Patent No.: US 11,958,540 B2
(45) Date of Patent: Apr. 16, 2024

(54) VEHICLE STORAGE SYSTEM

(71) Applicant: MAHINDRA AUTOMOTIVE NORTH AMERICA INC., Auburn Hills, MI (US)

(72) Inventors: John P. Pacella, Rochester Hills, MI (US); Anthony A. Pacella, Auburn Hills, MI (US); Timothy L. Sheldon, Farmington, MI (US); Robert B. Georgeff, Auburn Hills, MI (US)

(73) Assignee: MAHINDRA AUTOMOTIVE NORTH AMERICA INC., Auburn Hills, MI (US)

( * ) Notice: Subject to any disclaimer, the term of this patent is extended or adjusted under 35 U.S.C. 154(b) by 464 days.

(21) Appl. No.: 17/420,909

(22) PCT Filed: Jan. 7, 2020

(86) PCT No.: PCT/US2020/012490
§ 371 (c)(1),
(2) Date: Jul. 6, 2021

(87) PCT Pub. No.: WO2020/146317
PCT Pub. Date: Jul. 16, 2020

(65) Prior Publication Data
US 2022/0063734 A1 Mar. 3, 2022

Related U.S. Application Data

(60) Provisional application No. 62/789,225, filed on Jan. 7, 2019.

(51) Int. Cl.
*B62D 33/03* (2006.01)
*B60R 9/06* (2006.01)
*B62D 33/027* (2006.01)

(52) U.S. Cl.
CPC ............... *B62D 33/03* (2013.01); *B60R 9/06* (2013.01); *B62D 33/027* (2013.01)

(58) Field of Classification Search
CPC .... B60J 17/1607; B62D 33/027; B62D 33/03; B62D 33/033; B60R 9/06
See application file for complete search history.

(56) References Cited

U.S. PATENT DOCUMENTS 6,644,708 B1   11/2003   Grzegorzewski et al.
7,222,905 B2   5/2007    Jaeck
(Continued)

FOREIGN PATENT DOCUMENTS

KR   101296428 B1   8/2013

OTHER PUBLICATIONS

International Search Report of PCT/US2020/012490 dated Apr. 29, 2020, 3 pages.
(Continued)

*Primary Examiner* — Jason S Morrow
(74) *Attorney, Agent, or Firm* — Brooks Kushman P.C.

(57) ABSTRACT

An off-road vehicle includes a vehicle body with a passenger compartment and a cargo compartment adjacent to, and rearward of, the passenger compartment. A base is supported by the vehicle body and disposed over the cargo compartment, the base having a forward end, a rearward end, a first side, and a second side. A partition extends from the forward end of the base. A side panel is pivotally attached to the first side of the base about a longitudinal axis and attachable to the partition in a first configuration to facilitate storage, and moveable in an outward direction to provide a raised platform with the base in a second configuration. A rear panel is pivotally attached to the side panel about a transverse axis (Continued)

and connectable to the vehicle body in the second configuration to support the side panel without engaging an underlying external surface.

20 Claims, 10 Drawing Sheets

(56) References Cited

U.S. PATENT DOCUMENTS

| | | | |
|---|---|---|---|
| 9,511,803 B2 | 12/2016 | Wassell et al. | |
| 10,604,194 B2* | 3/2020 | Mar | B60J 7/11 |
| 10,800,341 B2* | 10/2020 | Merryman | B60R 9/065 |
| 11,673,458 B2* | 6/2023 | Cruckshank | B60P 7/135 |
| | | | 296/3 |
| 2005/0067849 A1 | 3/2005 | Walkden | |
| 2005/0225117 A1 | 10/2005 | Miskech et al. | |
| 2013/0341949 A1 | 12/2013 | Bernthisel | |
| 2014/0262583 A1* | 9/2014 | Url | B62D 33/023 |
| | | | 296/183.1 |
| 2018/0086277 A1 | 3/2018 | Wilson | |
| 2022/0355881 A1* | 11/2022 | Sidwell | B62D 33/0207 |

OTHER PUBLICATIONS

Written Opinion of PCT/US2020/012490 dated Apr. 29, 2020, 8 pages.

* cited by examiner

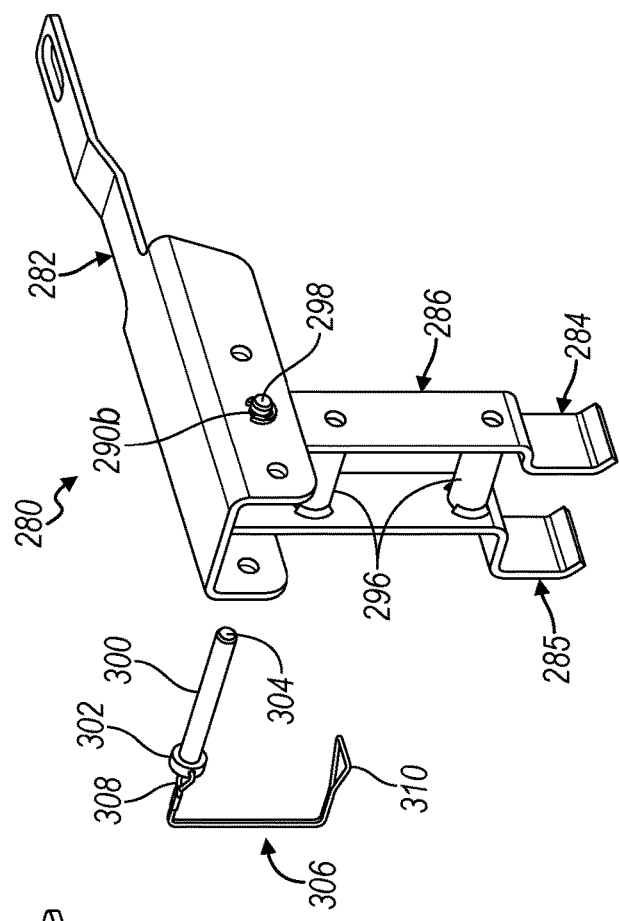
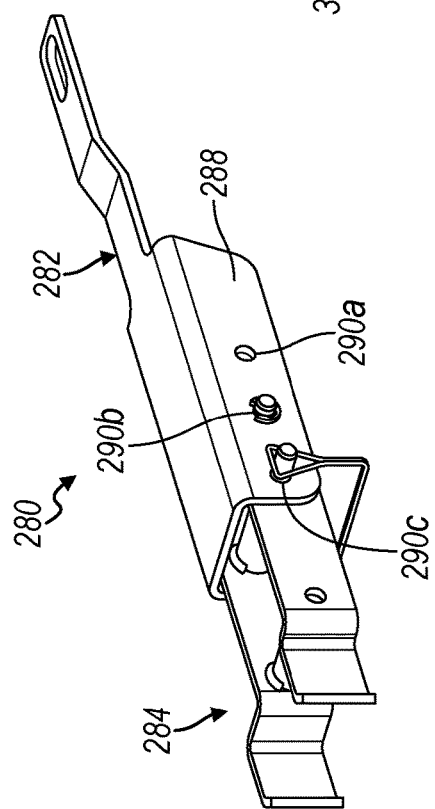
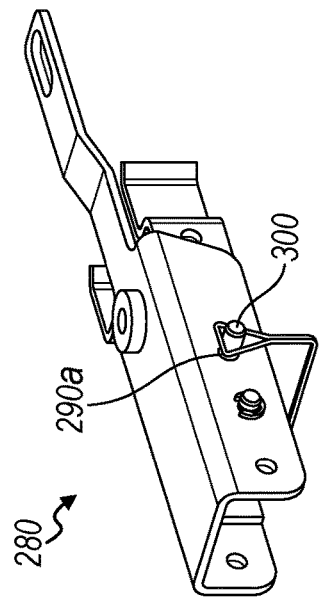
FIG. 10
FIG. 11
FIG. 12

VEHICLE STORAGE SYSTEM

CROSS-REFERENCE TO RELATED APPLICATIONS

This application is the U.S. national phase of International Application no. PCT/US2020/012490 filed Jan. 7, 2020, which claims the benefit of U.S. provisional application Ser. No. 62/789,225 filed Jan. 7, 2019, the disclosures of which are hereby incorporated in their entireties by reference herein.

TECHNICAL FIELD

One or more embodiments relate to a system for storing articles within a storage area of an off-road vehicle.

BACKGROUND

Off-road vehicles are often used to carry tools and equipment to a job-site at a remote location. Such remote locations may include rough terrain with limited space to perform intricate work. Accordingly, the user of such an off-road vehicle may use the vehicle itself as a work bench, however conventional off-road vehicles typically have limited space for such work.

SUMMARY

In one embodiment, a storage system is provided with a base and a bulkhead. The base is supported by a vehicle body and disposed over a vehicle cargo area. The bulkhead extends transversely from a forward end of the base. The storage system is also provided with a side panel and a rear panel. The side panel is pivotally attached to a side of the base and attachable to a side of the bulkhead in a first configuration for facilitating storage, and moveable in an outward direction for providing a raised platform with the base in a second configuration. The rear panel is pivotally attached to a rearward side of the side panel and adapted to couple to a bumper supported by the vehicle body in the second configuration for supporting the side panel without engaging an external surface.

In another embodiment, an off-road vehicle includes a vehicle body with a passenger compartment and a cargo compartment adjacent to, and rearward of, the passenger compartment. A base is supported by the vehicle body and disposed over the cargo compartment, the base having a forward end, a rearward end, a first side, and a second side. A partition extends from the forward end of the base and is oriented between the passenger compartment and the cargo compartment. A side panel is pivotally attached to the first side of the base about a longitudinal axis and attachable to the partition in a first configuration to facilitate storage, and moveable in an outward direction to provide a raised platform with the base in a second configuration. A rear panel is pivotally attached to the side panel about a transverse axis and connectable to the vehicle body in the second configuration to support the side panel without engaging an underlying external surface.

In yet another embodiment, a storage system is provided with a base adapted to be supported by a vehicle body and disposed over a vehicle cargo compartment, the base having a forward end, a rearward end, a first side, and a second side. A partition extends transversely from the forward end of the base. A side panel is pivotally attached to the first side of the base about a longitudinal axis and attachable to the partition in a first configuration to facilitate storage, and moveable in an outward direction to provide a raised platform with the base in a second configuration. A rear panel is pivotally attached to the side panel about a transverse axis and adapted to couple to a bumper supported by the vehicle body in the second configuration to support the side panel without engaging an external surface.

In another embodiment, an off-road vehicle includes a vehicle body with a passenger compartment and a cargo compartment adjacent to the passenger compartment. A bumper is mounted to the vehicle body rearward of the cargo compartment. A base is supported by the vehicle body and disposed over the cargo compartment, the base having a forward end, a rearward end, a first side, and a second side. A partition extends from the forward end of the base and oriented between the passenger compartment and the cargo compartment. A side panel includes a proximal end pivotally attached to a first side of the base and a forward end attachable to the partition in a first configuration to facilitate storage, and moveable in an outward direction to provide a raised platform with the base in a second configuration. A rear panel includes a proximal side pivotally attached to a rearward end of the side panel and connectable to the bumper in the second configuration to support the side panel without engaging an underlying external surface.

BRIEF DESCRIPTION OF THE DRAWINGS

FIG. 10 is an enlarged view of the bracket of FIG. 9.

FIG. 11 is another enlarged view of the bracket of FIG. 9, illustrated in an intermediate position.

FIG. 12 is another enlarged view of the bracket of FIG. 9, illustrated in a closed position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
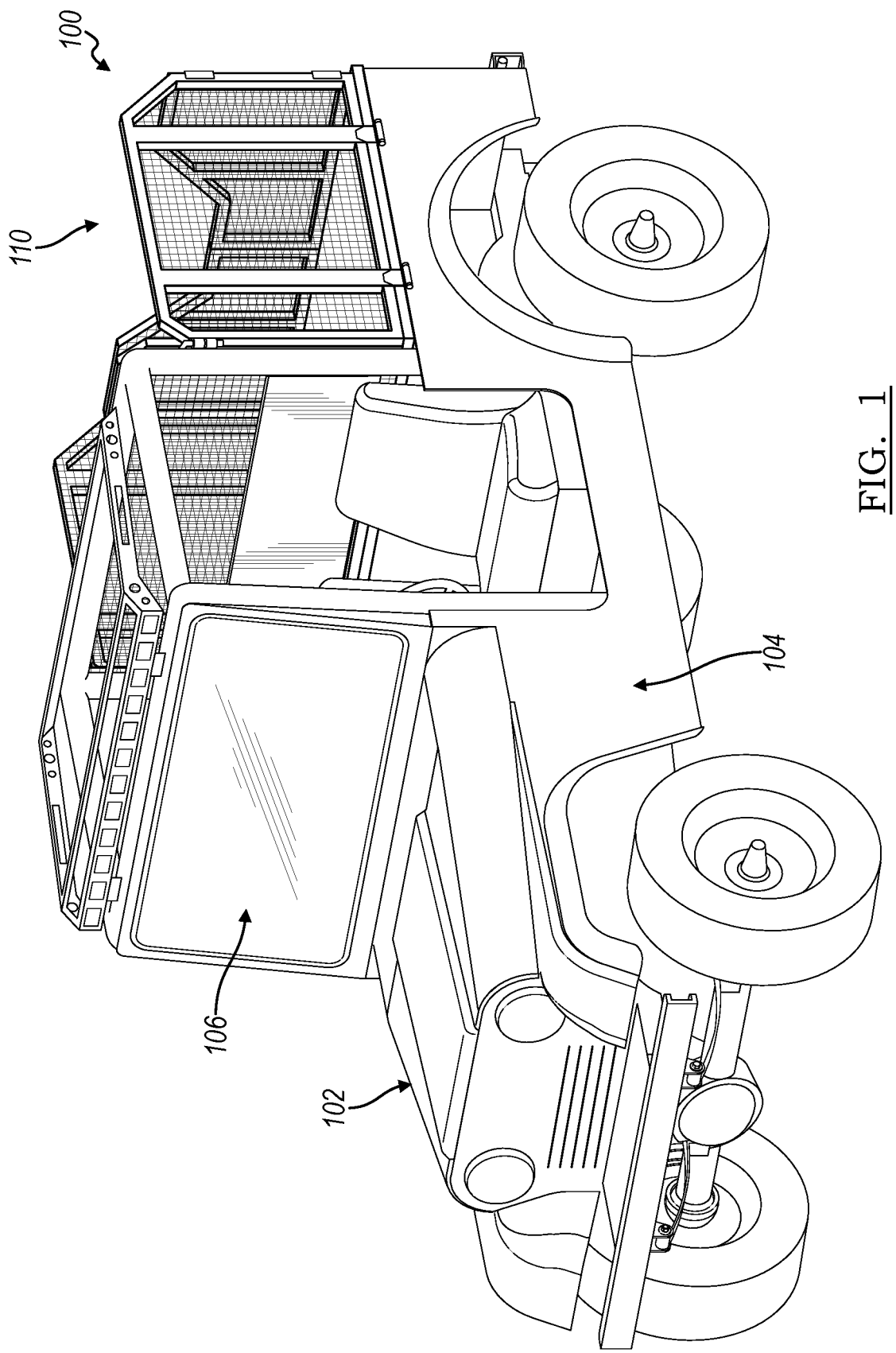
FIG. 1 is a front perspective view of an off-road vehicle with a storage system in accordance with one or more embodiments.
Figures 5, 6:
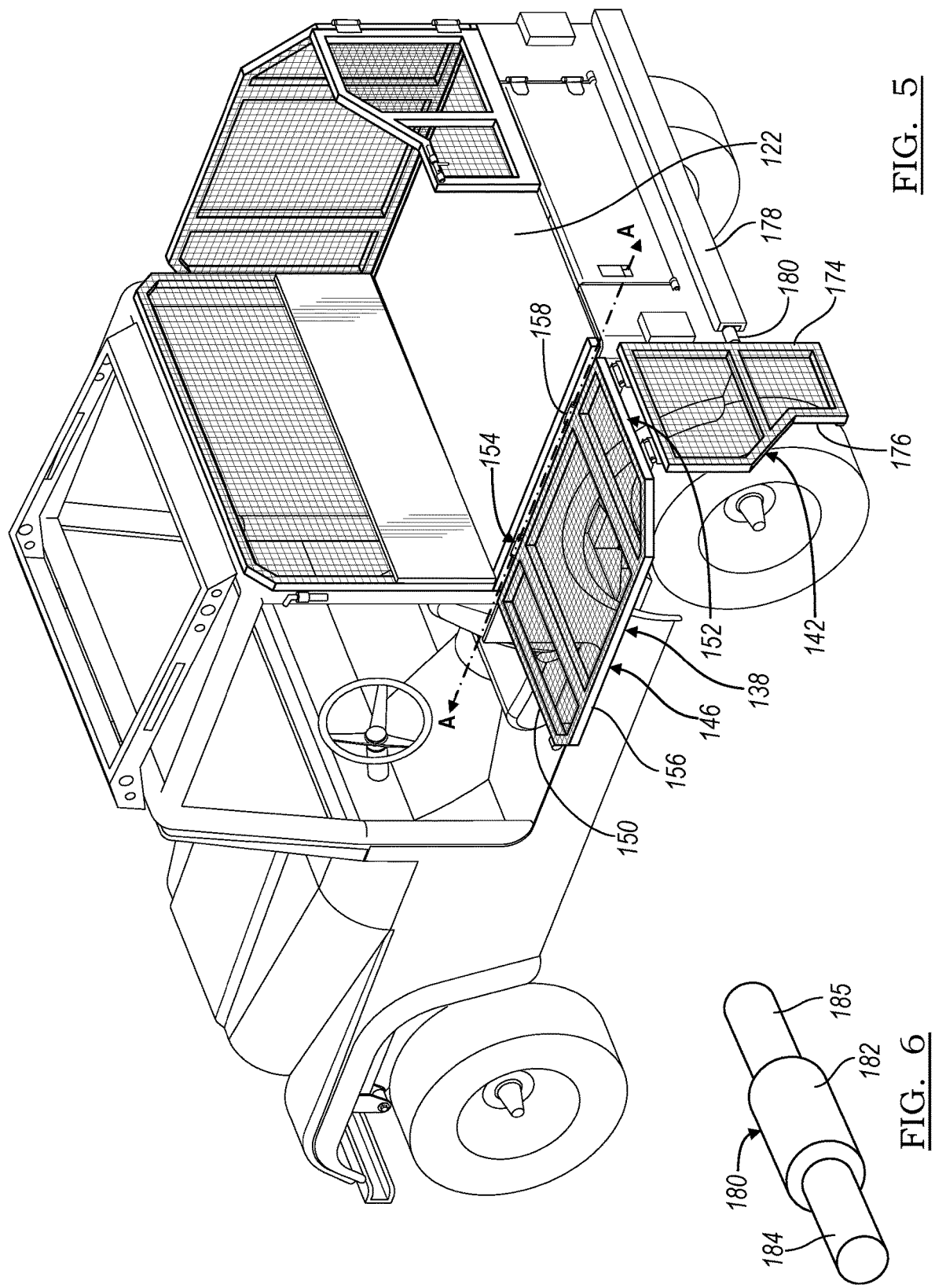
FIG. 5 is another rear perspective view of the off-road vehicle and storage system of FIG. 1, illustrated with a first side panel in an extended position and the first rear panel in a downward support position and coupled to the vehicle by a pin.
FIG. 6 is an enlarged perspective view of the pin of FIG. 5, according to one or more embodiments.

With reference to FIG. 1, a storage system is illustrated in accordance with one or more embodiments and generally referenced by numeral 100. The storage system 100 is supported by a vehicle 102, such as an off-road vehicle. The vehicle 102 includes a vehicle body 104 that defines a passenger compartment 106 and a cargo compartment or area 108 (shown in FIG. 2). The cargo area 108 is oriented rearward of the passenger compartment 106. The storage system 100 includes panels that are movable relative to each other for providing an additional storage area 110 for storing articles in a first configuration, as shown in FIG. 1, and for providing a raised platform in a second configuration, as shown in FIG. 5.

Figure 2:
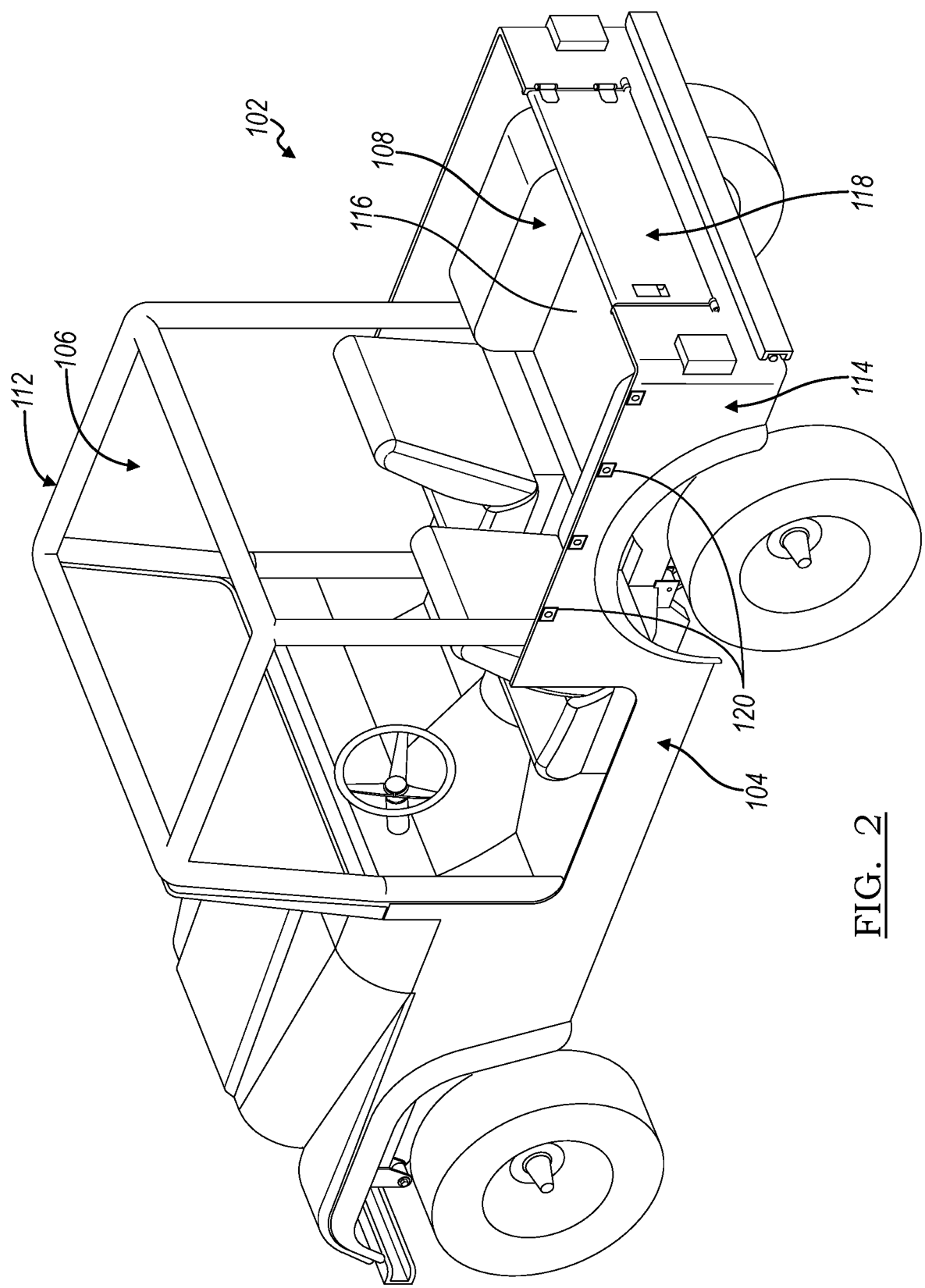
FIG. 2 is a top rear perspective view of the off-road vehicle, illustrated without the storage system.

Referring to FIG. 2, the vehicle 102 includes a roll-cage 112 that is supported by the vehicle body 104. A forward portion of the vehicle body 104 together with the roll-cage 112 defines the passenger compartment 106. The vehicle body 104 includes rear body panels 114 and a bed 116 that define the cargo area 108. The bed 116 includes a generally flat central surface and outer surfaces that are raised to accommodate the wheel wells. The vehicle 102 includes a tail gate 118 that is pivotably attached to the vehicle body to provide access to the cargo area 108 from the rear of the vehicle 102. The vehicle 102 also includes fasteners 120 (e.g., snaps, hooks, etc.) that are spaced along an upper edge of the rear body panels 114 for attaching a cover (not shown) over the cargo area 108.

A user may store tools and equipment in the cargo area 108 and drive the vehicle 102 to a job-site at a remote location. The user may then use the bed 114 as a work bench at the job-site, however its relatively small flat central surface may not be well-suited for large work pieces. The storage system 100, as shown in FIGS. 3-6, provides a large additional storage area 110 for storing articles in the first configuration (FIG. 3) and for providing a raised platform for accommodating large work pieces in the second configuration (FIG. 5).

Figure 3:
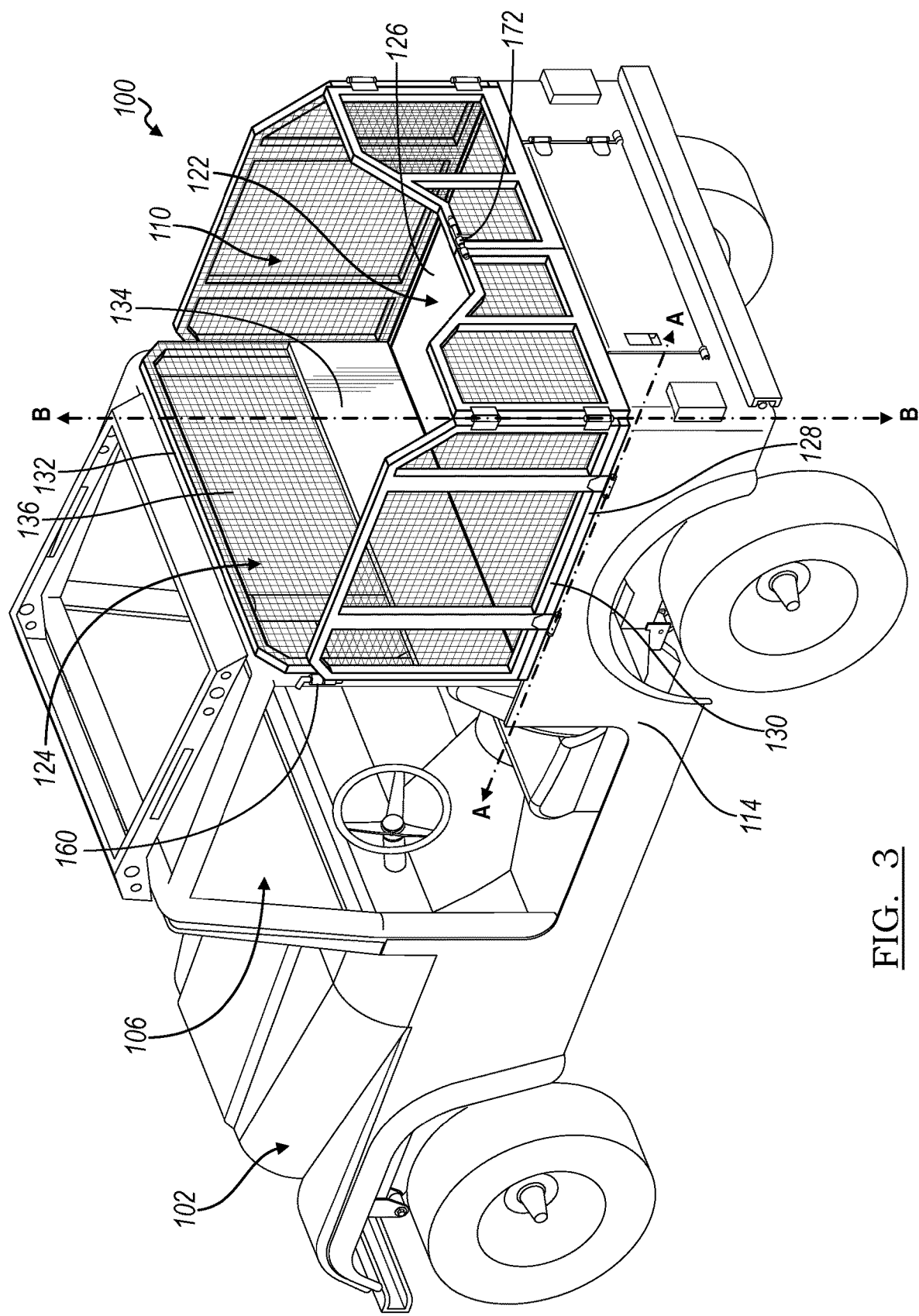
FIG. 3 is a top rear perspective view of the off-road vehicle and storage system of FIG. 1.

With reference to FIG. 3, the storage system 100 includes a base 122, a partition or bulkhead 124, and a plurality of movable panels for providing the additional storage area 110. The base 122 is supported by the rear body panels 114 and extends over the cargo area 108 (shown in FIG. 2). The base 122 includes a plate 126 that is formed in a generally rectangular planar shape with a forward end, a rearward end, and two sides. The base 122 also includes a flange 128 that extends transversely downward from each side of the plate 126 and over an upper portion of the rear body panels 114. The flange 128 may also extend downward from a portion of the rearward end of the plate 126, as shown in FIG. 3. The flange 128 helps locate the base 122 and prevent fluid from entering the cargo area 108. In one embodiment, the flange 128 includes apertures 130 for receiving the fasteners 120 (FIG. 2) for mounting the storage system 100 to the vehicle 102. The base 122 is formed of a solid rigid material, such as metal, aluminum, or a composite. In one or more embodiments, the plate 126 is thrilled with, or coated with, a textured surface to increase friction. In another embodiment, the vehicle body panels 114 are also coated with such a textured surface.

The bulkhead 124 extends upward from the forward end of the plate 126 and separates the passenger compartment 106 from the additional storage area 110. The bulkhead 124 includes a frame 132 that is attached to a rearward portion of the roll-cage 112. The bulkhead 124 includes a plate 134 that is attached to a lower portion of the frame 132, and mesh material 136 that extends between the plate 134 and an upper portion of the frame 132. The plate 134 may be formed of a solid rigid material, like the plate 126 of the base 122. The mesh material 136 includes holes between spaced apart rigid materials (e.g., wire) to provide a generally unobstructed view through the upper portion of the bulkhead 124, while preventing large objects stored in the additional storage area 110 from entering the passenger compartment 106.

Figure 4:
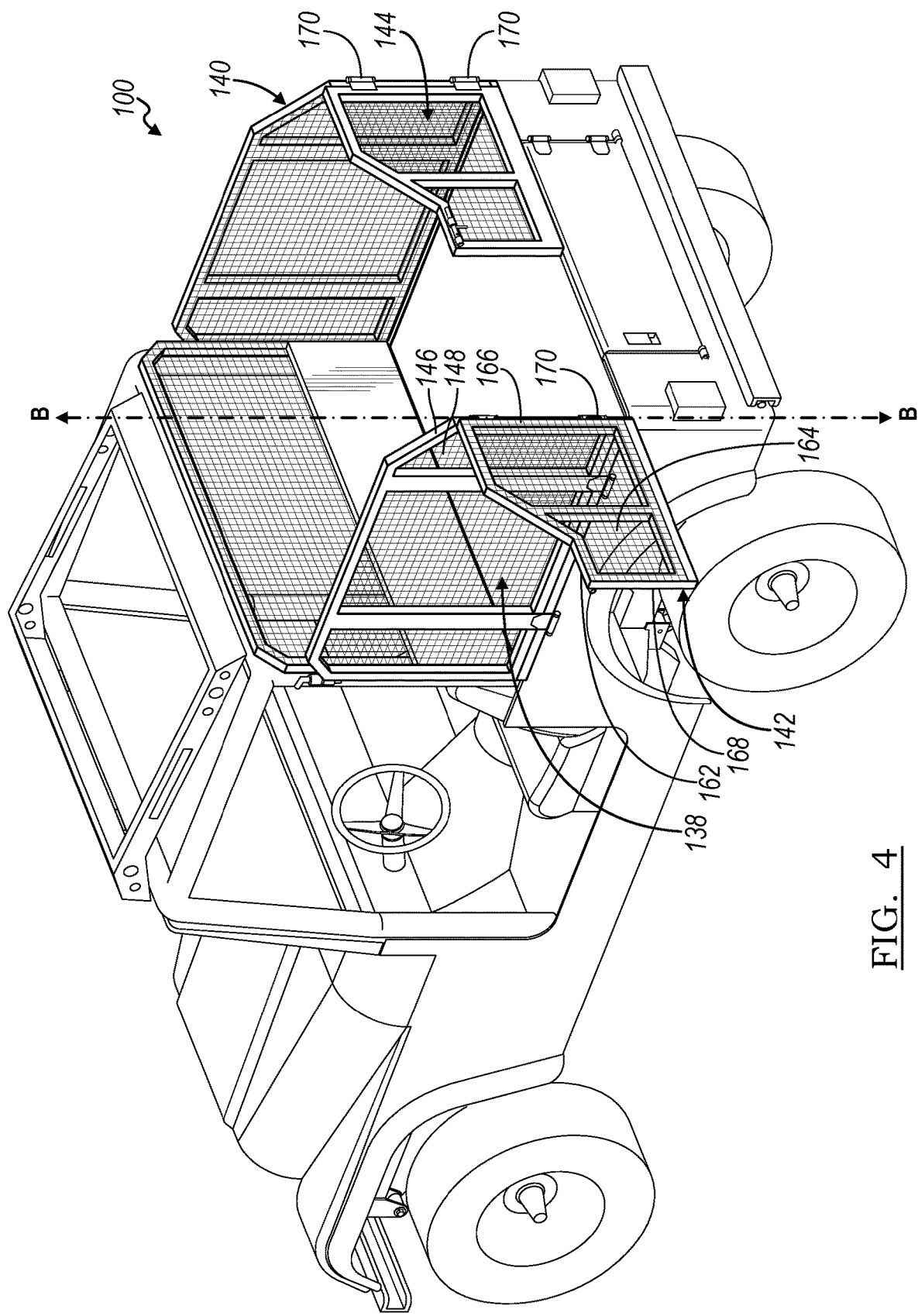
FIG. 4 is a rear perspective view of the off-road vehicle and storage system of FIG. 1, illustrated with a first rear panel in an open position and a second rear panel in a closed position.

Referring to FIGS. 4 and 5, the storage system 100 includes movable panels including two side panels 138, 140 and two rear panels 142, 144 that facilitate storage when oriented in a first configuration, as shown in FIG. 4. The side panels 138, 140 include a first side panel 138 and a second side panel 140 that are generally symmetric mirror images of each other, and therefore the following description is applicable to both panels. The first side panel 138 includes a frame 146 and mesh material 148 that is supported by the frame 146. The frame 146 is formed in a generally rectangular shape with a forward end 150, a rearward end 152, a proximal end 154, and a distal end 156 (shown in FIG. 5).

Figure 7:
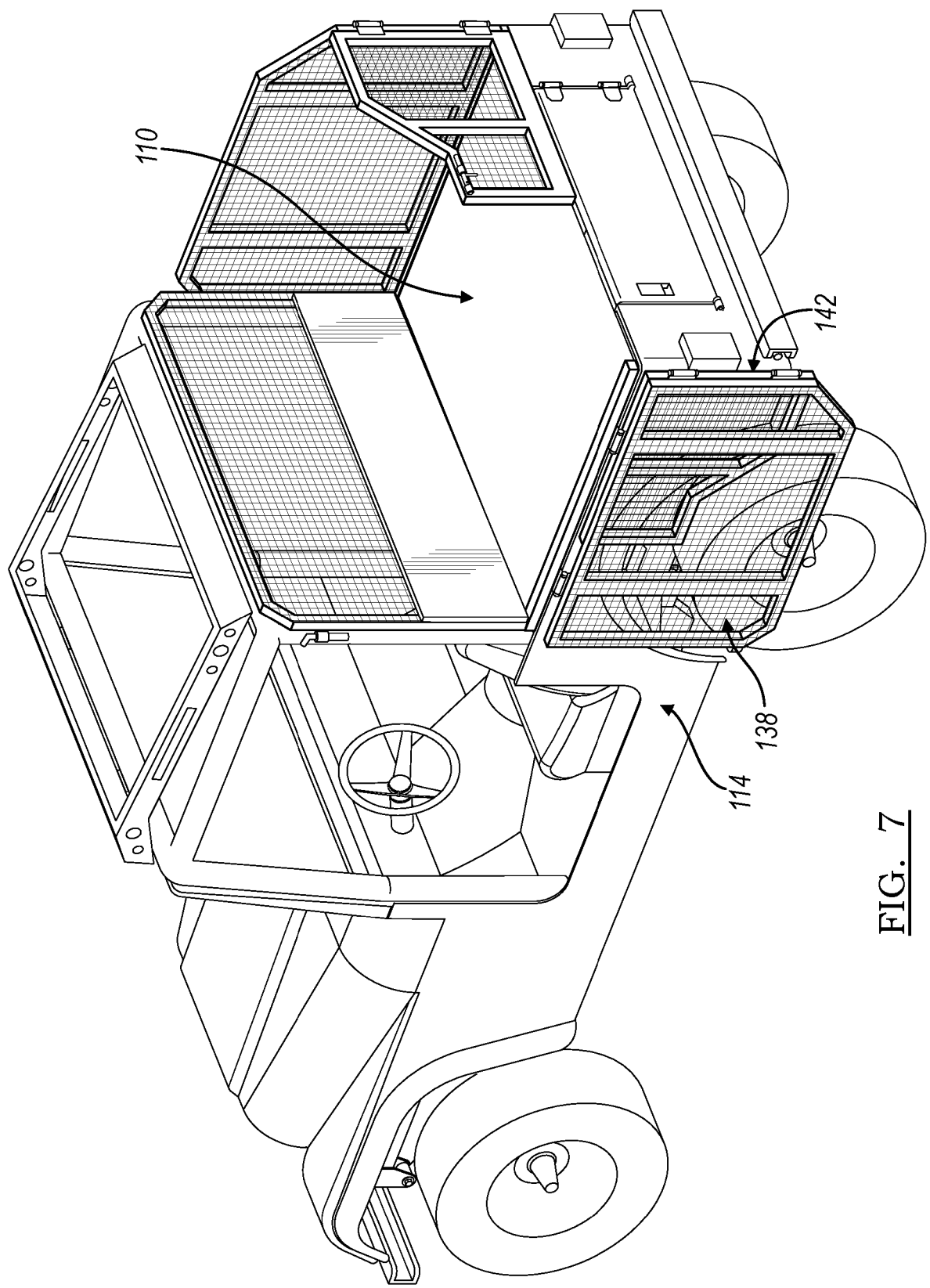
FIG. 7 is another rear perspective view of the off-road vehicle and storage system of FIG. 1, illustrated with the first side panel in a downward position and the first rear panel in a collapsed position between the first side panel and a rear vehicle body panel.

The first side panel 138 is pivotally attached to a side of the base 122. The proximal end 154 of the frame 146 includes a hinge 158 for pivotally attaching the first side panel 138 to the base 122 about a longitudinal axis A-A. The forward end 150 of the first side panel 138 includes a fastener 160 (shown in FIG. 3), such as a pin, for attaching the first side panel 138 to a side of the frame 132 of the bulkhead 124 in a closed position (FIG. 4). The first side panel 138 may pivot outward about axis A-A, when the pin 160 is removed, to an open position (FIG. 5) and further to a downward position (FIG. 7). The illustrated embodiment of the first side panel 138 includes two hinges 158 and one fastener/pin 160, however other embodiments contemplate different types and numbers of hinges and fasteners.

With reference to FIG. 4, the rear panels 142, 144 include a first rear panel 142 and a second rear panel 144 that are generally symmetric mirror images of each other, and therefore the following description is applicable to both panels. The first rear panel 142 includes a frame 162 and mesh material 164 that is supported by the frame 162. The frame 162 is formed in a generally rectangular shape with a proximal end 166 and a distal end 168.

The first rear panel 142 is pivotally attached to the rearward end of the first side panel 138. The proximal end 166 of the frame 162 includes a hinge 170 for pivotally attaching the first rear panel 142 to the first side panel 138 about a transverse axis B-B. The transverse axis B-B is oriented perpendicular to the longitudinal axis A-A, according to one or more embodiments. The distal end 168 of the first rear panel 142 includes a first fastener 172, such as a latch, for attaching the first rear panel 142 to the second rear panel 144 to provide a rear gate when the rear panels 142, 144 are in a closed position, as shown in FIG. 3. The first rear panel 142 may pivot outward about axis B-B to an open position when the latch 172 is unlatched, as shown in FIG. 4. The illustrated embodiment of the first rear panel 142 includes two hinges 170 and one fastener/latch 172, however other embodiments contemplate different types and numbers of hinges and fasteners.

Referring to FIG. 5, the storage system 100 provides a raised platform when the movable panels 138, 142 are oriented in a second configuration. The first rear panel 142 includes an inner end 174 and an outer end 176. The inner end 174 is adjacent to the base 122 when the first rear panel 142 is oriented in the first configuration (FIG. 4) and coupled to a bumper 178 when the first rear panel 142 is oriented in the second configuration (FIG. 5). The storage system 100 includes a fastener 180, such as a pin, to couple the first rear panel 142 to the bumper 178.

With reference to FIG. 6, in one embodiment, the pin 180 is formed as a cylindrical shaft with a central portion 182 and two outer portions 184, 185. The inner end 174 of the first rear panel 142 includes an aperture for receiving a first outer portion 184 of the pin 180. In one embodiment, the first outer portion 184 and aperture are threaded for securing the pin 180 to the first rear panel 142. In another embodiment, the fastener is fixed to a bracket that is pivotally attached to the bumper or the first rear panel (see e.g., FIGS. 9-12) for adjusting between the position shown in FIG. 5, and to a collapsed position so that it is out of the way of the base 122 when the first rear panel 142 is oriented in the closed position (FIG. 3.)

A side surface of the bumper 178 includes an aperture for receiving the second outer portion 185 of the pin 180, according to one or more embodiments. The aperture is sized with an inner diameter that is less than an outer diameter of the central portion 182 such that the central portion 182 of the pin 180 engages the side surface of the bumper 178 about the aperture to support the first rear panel 142 and the first side panel 138 in the second configuration as a raised platform as shown in FIG. 5. In one or more embodiments, the outer portion 185 of the pin 180 is formed with a tapered end to help align the pin 180 with the aperture during installation.

The storage system 100 provides a raised platform in which the side panels 138, 140 align with the base 122 regardless of the terrain. For example, the vehicle 102 may be driven off road to a location where the ground is uneven. If the first side panel 138 was supported by the ground, it may be difficult to position the first side panel 138 so that it is generally parallel with the base 122 on uneven ground. However, by supporting the first side panel 138 with the vehicle 102 itself, i.e., with the bumper 178 through the first rear panel 142, the first side panel 138 is aligned with the base 122 regardless of the terrain. When both side panels 138, 140 are oriented in the open configuration, the panels and the base 122 collectively provide a raised platform that is approximately ten feet long, according to one or more embodiments. Further, the outer end 176 of the first rear panel 142 is tapered inward along the outer end 176 from the proximal end 166 towards the distal end 168 to provide additional ground clearance laterally outward from the wheels.

Referring to FIG. 7, the first side panel 138 and first rear panel 142 are adapted to collapse over each other to provide additional access to the additional storage area 110. The first rear panel 142 is adapted to pivot about axis B-B (FIG. 4) and collapse between the first side panel 138 and the rear body panel 114. In one or more embodiments, the first side panel 138 and/or the first rear panel 142 includes a fastener (not shown) for securing the panels 138, 142 against the rear body panel 114 so that the vehicle 102 may be driven with the panels in the collapsed position.

Figure 8:
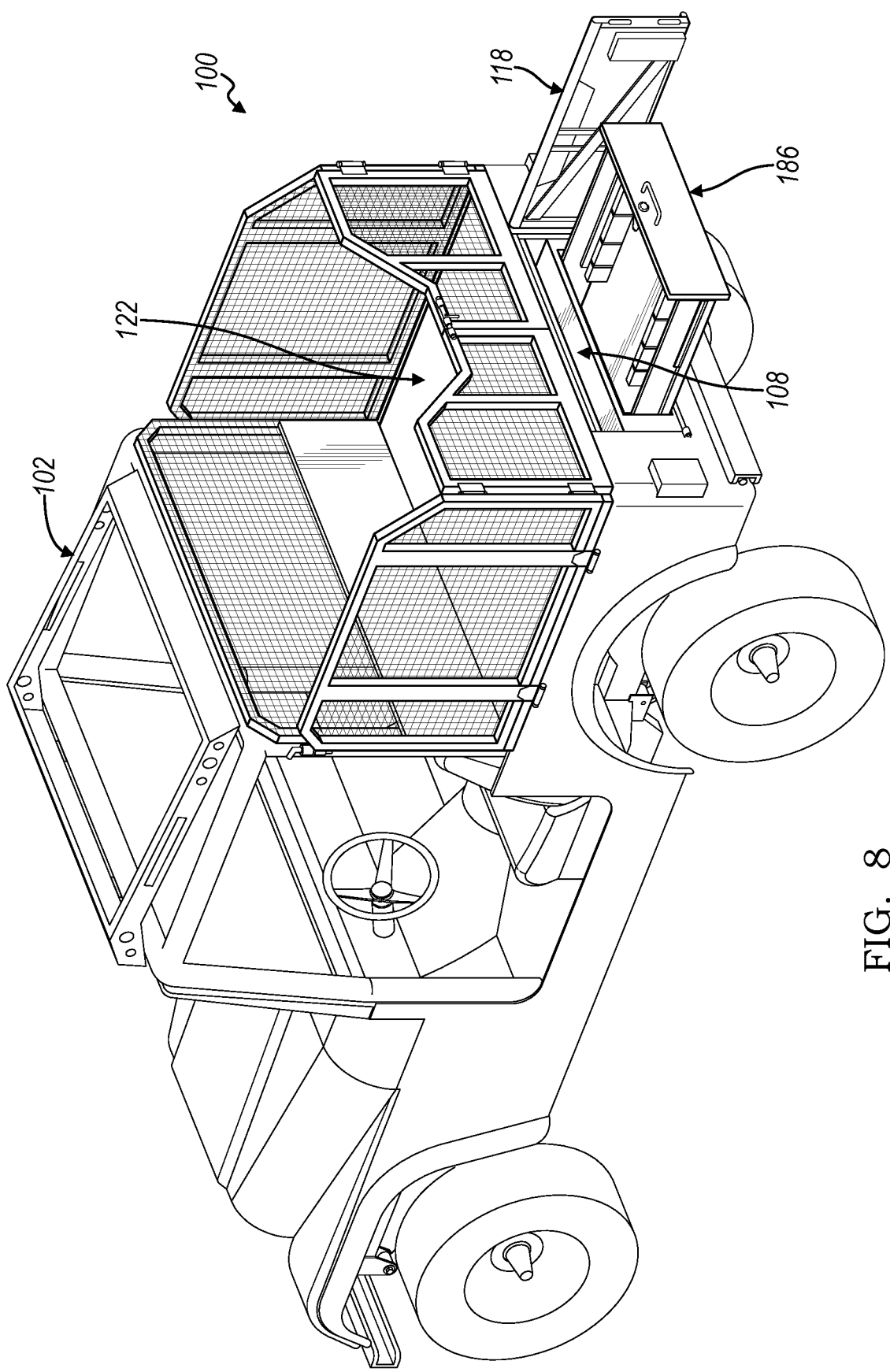
FIG. 8 is another top rear perspective view of the off-road vehicle and storage system of FIG. 1, illustrated with a tail gate in an open position with a drawer extending from a cargo area of the vehicle.

With reference to FIG. 8, the base 122 of the storage system 100 and the tail gate 118 enclose the cargo area 108 of the vehicle 102. In one or more embodiments, the vehicle 102 includes a drawer 186 that is supported within the cargo area 108 and translates outward, to provide external access to any contents within the drawer 186, when the tail gate 118 is open.

With reference to FIGS. 9-12, a storage system is illustrated in accordance with another embodiment, and generally referenced by numeral 200. The storage system 200 is similar to the storage system 100 described with reference to FIGS. 1-8, except the panels are formed in different shapes and constructions, and the mechanism for coupling the rear panels to the bumper is different. The storage system 200 is supported by a vehicle 102, such as an off-road vehicle (FIG. 1). The storage system 200 includes panels that are movable relative to each other for providing an additional storage area 210 for storing articles in a first configuration, as shown on the right side of FIG. 9, and for providing a raised platform in a second configuration, as shown on the left side of FIG. 9.

Figure 9:
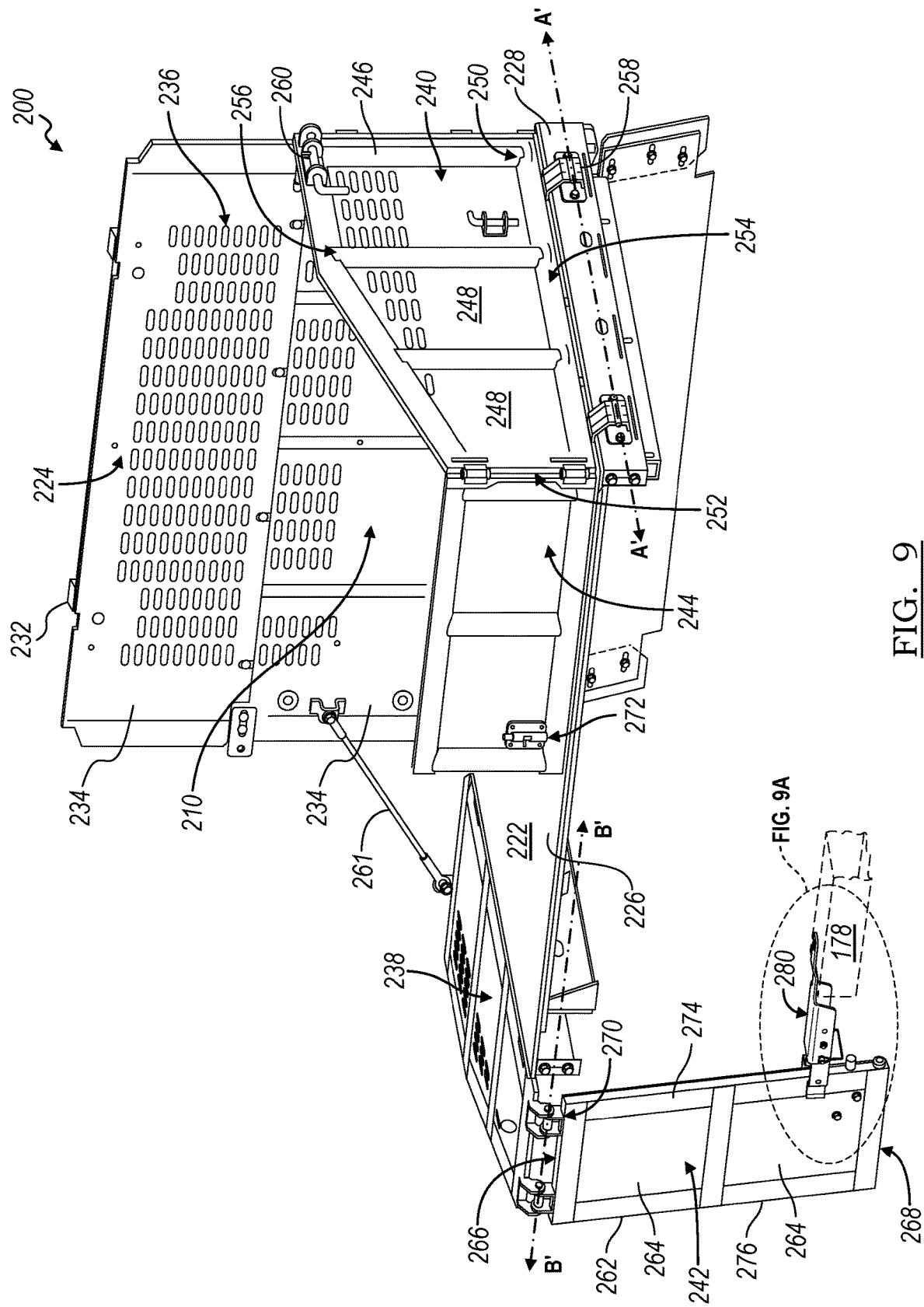
FIG. 9 is a rear perspective view of a storage system in accordance with another embodiment, illustrated with a first side panel in an extended position and a first rear panel in a downward support position and coupled to the vehicle by a bracket.

Referring to FIG. 9, the storage system 200 includes a base 222, a partition or bulkhead 224, and a plurality of movable panels for providing the additional storage area 210. The base 222 is supported by the rear body panels 114 and extends over the cargo area 108 (shown in FIG. 2). The base 222 includes a plate 226 that is formed in a generally rectangular planar shape with a forward end, a rearward end, and two sides. The base 222 also includes a flange 228 that extends transversely downward from each side of the plate 226 and over an upper portion of the rear body panels 114 (FIG. 3).

The bulkhead 224 extends upward from the forward end of the plate 226 and separates the passenger compartment 106 (FIG. 2) from the additional storage area 210. The bulkhead 224 includes a frame 232 that is attached to a rearward portion of the roll-cage 112 (FIG. 3). The bulkhead 224 includes one or more plates 234 that are attached to the frame 232, which include a plurality of apertures 236 formed through to provide a generally unobstructed view through the upper portion of the bulkhead 224, while preventing large objects stored in the additional storage area 210 from entering the passenger compartment 106 (FIG. 2).

The storage system 200 includes movable panels including two side panels 238, 240 and two rear panels 242, 244 that facilitate storage when oriented in a first configuration, as shown in the right side of FIG. 9. The side panels 238, 240 include a first side panel 238 and a second side panel 240 that are generally symmetric mirror images of each other, and therefore the following description is applicable to both panels. The second side panel 240 includes a frame 246 and multiple sections 248 that are supported by the frame 246. The sections 248 may include a plurality of apertures formed through. In other embodiments, the rear panels are formed as a unitary panel.

The frame 246 is formed with a forward end 250, a rearward end 252, a proximal end 254, and a distal end 256 that tapers inward from the forward end 250 to the rearward end 252. The second side panel 240 is pivotally attached to a side of the base 222. The proximal end 254 of the frame 246 includes hinges 258 for pivotally attaching the second side panel 240 to the base 222 about a longitudinal axis A'-A'.

The forward end 250 of the second side panel 240 includes a fastener 260, such as a pin, for attaching the second side panel 240 to a side of the frame 232 of the bulkhead 224 in a closed position. The second side panel 240 may pivot outward about axis A-A, when the pin 260 is removed, to an open position (as shown by the first side panel 238) and further to a downward position (FIG. 7). In one or more embodiments, the storage system 200 includes a cable 261 connected between the first side panel 238 and the bulkhead 224 for supporting the first side panel 238 in the open position. The illustrated embodiment of the second side panel 240 includes two hinges 258 and one fastener/pin 260, however other embodiments contemplate different types and numbers of hinges and fasteners.

The rear panels 242, 244 include a first rear panel 242 and a second rear panel 244 that are generally symmetric mirror images of each other, and therefore the following description is applicable to both panels. The first rear panel 242 includes a frame 262 and sections 264 that are supported by the frame 262, In other embodiments, the rear panels are formed as a unitary panel. The frame 262 is formed in a generally rectangular shape with a proximal end 266 and a distal end 268.

The first rear panel 242 is pivotally attached to the rearward end of the first side panel 238 about a transverse axis B'-B' by a hinge 270. The transverse axis B'-B' is oriented perpendicular to the longitudinal axis A-A, according to one or more embodiments.

The second rear panel 244 includes a fastener 272, such as a latch, for attaching the first rear panel 242 to the second rear panel 244 to provide a rear gate when the rear panels 242, 244 are in a closed position. The first rear panel 242 includes a second fastener 273, such as a pin that is spring biased outward, that extends downward through an aperture formed in the base 222 for attaching the first rear panel 242 to the base 222. The first rear panel 242 may pivot outward about axis B-B to an open position when the latch 272 is unlatched. The illustrated embodiment includes two hinges 270 and one fastener/latch 272, however other embodiments contemplate different types and numbers of hinges and fasteners.

The storage system 200 provides a raised platform when the movable panels 238, 242 are oriented in a second configuration. The first rear panel 242 includes an inner end 274 and an outer end 276. The inner end 274 is adjacent to the base 222 when the first rear panel 242 is oriented in the first configuration and coupled to the bumper 178 when the first rear panel 242 is oriented in the second configuration.

Figure 9A:
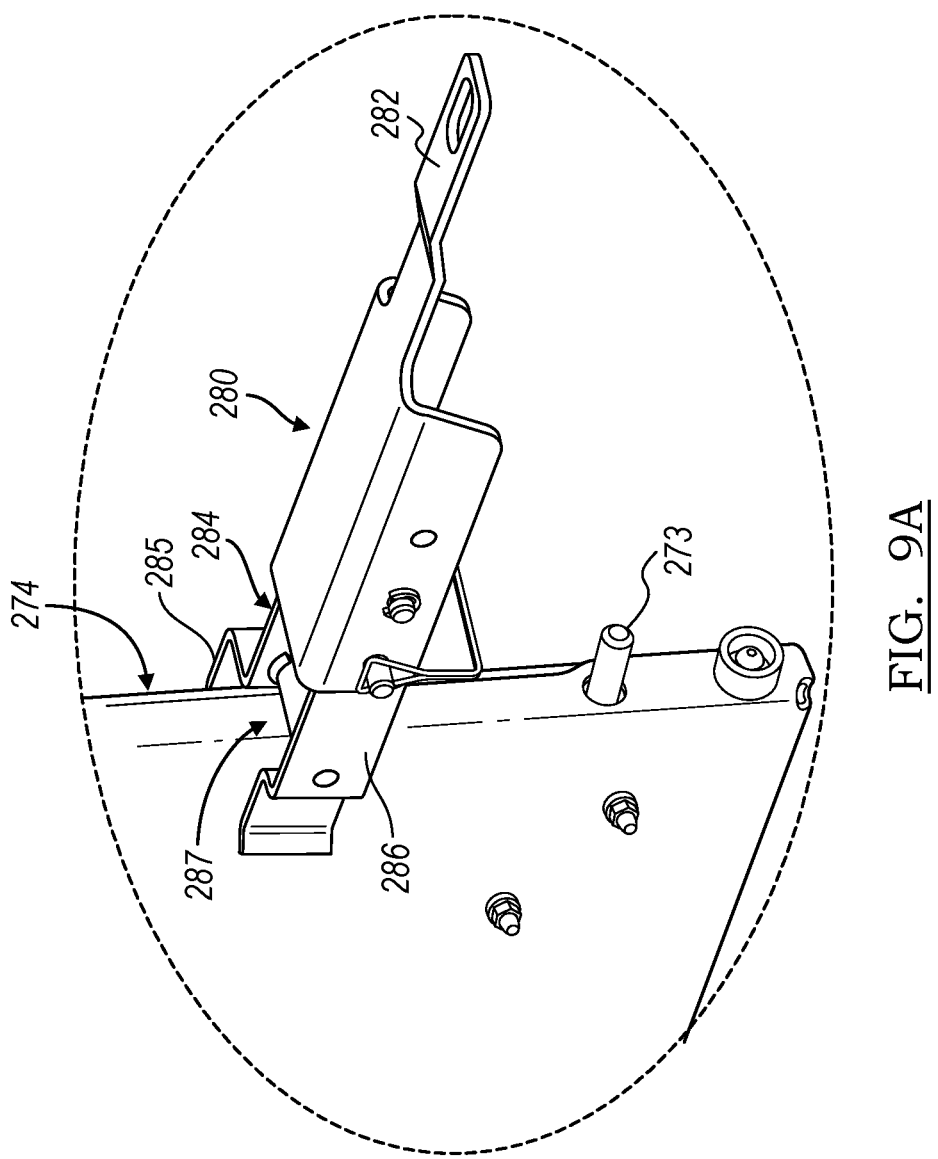
FIG. 9A is an enlarged view of an encircled portion of FIG. 9.

The storage system 200 includes a coupler 280 to couple the first rear panel 242 to the bumper 178. Referring to FIG. 9A, the coupler 280 is a multi-piece adjustable bracket, according to one or more embodiments. The coupler 280 includes a bracket 282 that is mounted to an upper surface of the bumper 178. In one embodiment, the bracket 282 is formed in an elongate shape with a proximal end with an aperture formed through for receiving a threaded fastener for mounting to the bumper 178. The coupler 280 includes a receiver 284 that supports the inner end 274 of the first rear panel 242 in the second configuration as a raised platform. The receiver 284 includes a first arm 285 and a second arm 286 that are spaced apart from each other such that the distal ends of the arms 285, 286 collectively form a pocket 287 for receiving the inner end 274 of the first rear panel 242.

With reference to FIG. 10, the receiver 284 is pivotally attached to the bracket 282. A distal end of the bracket 282 includes a base and a pair of flanges 288 that extend transversely from opposing sides of the base. Each flange 288 includes a series of apertures 290, including a proximal aperture 290A, a central aperture 290B, and a distal aperture 290C that align with corresponding apertures of the other flange 288.

Referring to FIG. 11, the first arm 285 and the second arm 286 of the receiver 284 are spaced apart from each other by a pair of bushings 296. The bushings 296 are coaxially aligned with apertures formed in each arm. A pin 298 extends through the central aperture 290B of the bracket 282 and through corresponding apertures formed through the proximal end of each arm 285, 286 to pivotally connect the receiver 284 to the bracket 282 for adjusting between an extended position (FIG. 10) to engage the rear panel, and a retracted position (FIG. 12) to stow the receiver 284.

The receiver 284 includes a removable pin 300 for locking the receiver 284 in the extended position (FIG. 10) and in the retracted position (FIG. 12). As shown in FIG. 10, the pin 300 extends through the distal apertures 290C and corresponding bushing 296 to lock the receiver 284 in the extended position. The removable pin 300 includes a head 302 and a distal end 304. In one or more embodiments, the pin 300 includes a latch 306 with a first end 308 that is connected to the head 302 of the pin, and a second end 310 that engages the distal end 304 of the pin 300 to secure the pin 300. As shown in FIG. 12, the pin 300 extends through the proximal apertures 290A and corresponding bushing 296 to lock the receiver 284 in the retracted position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An off-road vehicle comprising:
    a vehicle body with a passenger compartment and a cargo compartment adjacent to, and rearward of, the passenger compartment;
    a base supported by the vehicle body and disposed over the cargo compartment, the base having a forward end, a rearward end, a first side, and a second side;
    a partition extending from the forward end of the base and oriented between the passenger compartment and the cargo compartment;
    a side panel pivotally attached to the first side of the base about a longitudinal axis and attachable to the partition in a first configuration to facilitate storage, and moveable in an outward direction to provide a raised platform with the base in a second configuration; and
    a rear panel pivotally attached to the side panel about a transverse axis and connectable to the vehicle body in the second configuration to support the side panel without engaging an underlying external surface.

2. The off-road vehicle of claim 1 wherein the side panel and the rear panel maintain a transverse orientation between the longitudinal axis and the transverse axis in both the first configuration and the second configuration.

3. The off-road vehicle of claim 1 further comprising:
    a second side panel pivotally attached to the second side of the base about a second longitudinal axis and attachable to the partition in the first configuration to facilitate storage, and movable in an outward direction to provide the raised platform with the side panel and the base in the second configuration, and wherein the raised platform is oriented in a generally planar shape.

4. The off-road vehicle of claim 3 further comprising: a second rear panel pivotally attached to the second side panel about a second transverse axis and connectable to the vehicle body in the second configuration to support the second side panel without engaging the underlying external surface.

5. The off-road vehicle of claim 1 wherein the rear panel comprises:
a proximal end pivotally attached to a rearward side of the side panel;
a distal end opposite to and shorter than the proximal end;
an inner end that extends between the proximal end and the distal end and is oriented adjacent to the base in the first configuration; and
an outer end opposite the inner end and tapered to extend between the proximal end and the distal end and provide additional ground clearance laterally outward from the vehicle body in the second configuration.

6. The off-road vehicle of claim 1 further comprising a removable pin to couple the rear panel to the vehicle body in the second configuration.

7. The off-road vehicle of claim 1 further comprising an attached mechanism that is pivotally attached to one of the vehicle body and the rear panel to couple the rear panel to the vehicle body in the second configuration.

8. The off-road vehicle of claim 1 further comprising a drawer disposed in the cargo compartment between the base and the vehicle body.

9. A storage system comprising:
a base adapted to be supported by a vehicle body and disposed over a vehicle cargo compartment, the base having a forward end, a rearward end, a first side, and a second side;
a partition extending transversely from the forward end of the base;
a side panel pivotally attached to the first side of the base about a longitudinal axis and attachable to the partition in a first configuration to facilitate storage, and moveable in an outward direction to provide a raised platform with the base in a second configuration; and
a rear panel pivotally attached to the side panel about a transverse axis and adapted to couple to a bumper supported by the vehicle body in the second configuration to support the side panel without engaging an external surface.

10. A passenger vehicle comprising:
a vehicle body with a passenger compartment and a vehicle cargo compartment adjacent to the passenger compartment; and
a storage system according to claim 9 supported by the vehicle body.

11. The storage system of claim 9 further comprising:
a second side panel pivotally attached to the second side of the base about a second longitudinal axis and attachable to the partition in the first configuration to facilitate storage, and movable in an outward direction to provide the raised platform with the side panel and the base in the second configuration, and wherein the second side panel, the side panel, and the base are arranged coplanar relative to each other in the second configuration.

12. The storage system of claim 11 further comprising:
a second rear panel pivotally attached to the second side panel about a second transverse axis and adapted to couple to the bumper in the second configuration to support the second side panel without engaging the underlying external surface.

13. The storage system of claim 9 wherein the rear panel comprises:
a proximal end pivotally attached to a rearward side of the side panel;
a distal end opposite to and shorter than the proximal end;
an inner end that extends between the proximal end and the distal end and is oriented adjacent to the base in the first configuration; and
an outer end opposite the inner end and tapered to extend between the proximal end and the distal end and provide additional ground clearance laterally outward from the bumper in the second configuration.

14. The storage system of claim 9 further comprising a removable pin to couple the rear panel to the bumper in the second configuration.

15. The storage system of claim 9 further comprising an attached mechanism that is pivotally attached to one of the bumper and the rear panel to couple the rear panel to the bumper in the second configuration.

16. An off-road vehicle comprising:
a vehicle body with a passenger compartment and a cargo compartment adjacent to the passenger compartment;
a bumper mounted to the vehicle body rearward of the cargo compartment;
a base supported by the vehicle body and disposed over the cargo compartment, the base having a forward end, a rearward end, a first side, and a second side;
a partition extending from the forward end of the base and oriented between the passenger compartment and the cargo compartment;
a side panel with a proximal end pivotally attached to the first side of the base and a forward end attachable to the partition in a first configuration to facilitate storage, and moveable in an outward direction to provide a raised platform with the base in a second configuration; and
a rear panel with a proximal side pivotally attached to a rearward end of the side panel and connectable to the bumper in the second configuration to support the side panel without engaging an underlying external surface.

17. The off-road vehicle of claim 16 further comprising:
a second side panel with a second proximal end pivotally attached to the second side of the base and a second forward end attachable to the partition in the first configuration to facilitate storage, and movable in an outward direction to provide the raised platform with the side panel and the base in the second configuration.

18. The off-road vehicle of claim 17 further comprising:
a second rear panel with a second proximal side pivotally attached to a second rearward end of the second side panel and connectable to the bumper in the second configuration to support the second side panel without engaging the underlying external surface.

19. The off-road vehicle of claim 16 further comprising a removable pin to couple the rear panel to the bumper in the second configuration.

20. The off-road vehicle of claim 16 further comprising an attached mechanism that is pivotally attached to one of the bumper and the rear panel to couple the rear panel to the bumper in the second configuration.

* * * * *